United States Patent
Yamauchi (10) Patent No.: US 7,974,184 B2
(45) Date of Patent: Jul. 5, 2011

(54) RADIO NETWORK SYSTEM AND CONTROL NODE SWITCHING METHOD

(75) Inventor: Masaki Yamauchi, Osaka (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 96 days.

(21) Appl. No.: 12/458,530

(22) Filed: Jul. 15, 2009

(65) Prior Publication Data

US 2010/0080118 A1    Apr. 1, 2010

(30) Foreign Application Priority Data

Sep. 30, 2008   (JP) .................................. 2008-252711

(51) Int. Cl.
*G06F 11/00*    (2006.01)
(52) U.S. Cl. ........................................ 370/221; 216/310
(58) Field of Classification Search .................. 370/221, 370/216, 310
See application file for complete search history.

(56) References Cited

U.S. PATENT DOCUMENTS

| 7,848,223 B2 * | 12/2010 | Budampati et al. ........... 370/216 |
| 2006/0126501 A1 * | 6/2006 | Ramaswamy ................. 370/221 |
| 2009/0154343 A1 * | 6/2009 | Fitch et al. .................... 370/221 |
| 2010/0271989 A1 * | 10/2010 | Chernoguzov et al. ....... 370/310 |

OTHER PUBLICATIONS

"Local and Metropolitan Area Network—Part 15.4B", IEEE, P802. 15.4, REVb/D6 (Non-Patent Document 1) as a part of the standard IEEE802.15.4 by U.S. Society of Electric and Electronics, 2006.

* cited by examiner

*Primary Examiner* — Albert T Chou
(74) *Attorney, Agent, or Firm* — Rabin & Berdo, P.C.

(57) ABSTRACT

A radio network system and a control node switching method which can improve a reliability of the whole network and improve a wording efficiency. The system includes at least one alternate control node which can be substituted form the control node. The alternate control node monitors an operating state in the control node and discriminates whether or not the operating state is abnormal. When the operating state is determined to be abnormal, the alternate control node sets its own address into a control node address.

7 Claims, 10 Drawing Sheets

OPERATING STATES OF SYNC NODE 100 / SUBSYNC NODE 101

| ACTING STATE | STATE WHERE MULTICONTROLLER FUNCTION IS PERFORMED AS A SYNC NODE | NETWORK ADDRESS = "0000" |
|---|---|---|
| MONITORING STATE | STATE WHERE SYNC NODE IS MONITORED AND WAITED AS A SUBSYNC NODE | NETWORK ADDRESS = SUBSYNC NODE ALLOCATED |
| SLEEPING STATE | STOP STATE WHERE MAIN FUNCTION AS A NODE HAS BEEN STOPPED OR POWER-OFF STATE | NETWORK ADDRESS = CANNOT BE RECOGNIZED |

NETWORK ASSOCIATION NODE TABLE 20,21

| MAC ADDRESS | NETWORK ADDRESS | OPERATING STATE | NODE ATTRIBUTES |
|---|---|---|---|
| AA:BB:CC:EE:FF:00:00 | "0000" | ACTING STATE | SYNC NODE |
| AA:BB:CC:EE:FF:00:01 | "0100" | MONITORING STATE | SUBSYNC NODE |
| ⋮ | ⋮ | ⋮ | ⋮ |
| AA:BB:CC:EE:FF:00:0F | "0201" | ⋮ | ROUTER |

RADIO NETWORK SYSTEM AND CONTROL NODE SWITCHING METHOD

BACKGROUND OF THE INVENTION

1. Field of the Invention

The invention relates to a radio network system for making multihop radio communication by including a plurality of radio node apparatuses (hereinafter, simply referred to as nodes) and to a control node switching method in the radio network system.

2. Description of the Related Art

In recent years, attention has been paid to a short-distance radio communication system called PAN (Personal Area Network). IEEE802.15.4 as an international standard specifies standard specifications in a physical layer and an MAC layer in the short-distance radio communication system.

Figure 1:
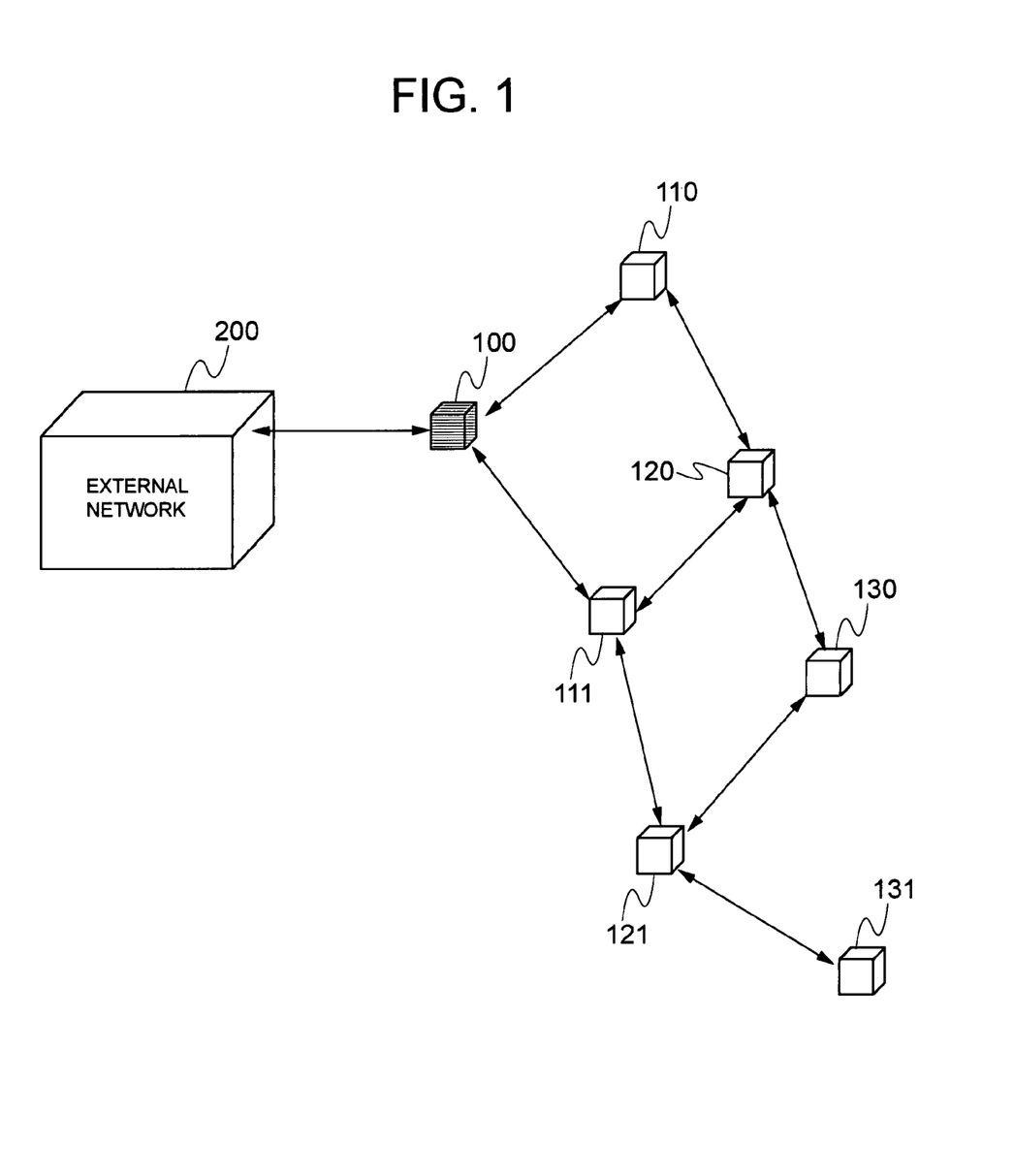
FIG. 1 is a block diagram showing a construction of a sensor network system in the related art.

FIG. 1 shows the structure of a sensor network system in the related art as a radio network system using the short-distance radio communication system. The sensor network system is constituted by a sync node 100 and a plurality of sensor nodes 110 to 131. The sync node 100 collects sensor data from the plurality of sensor nodes 110 to 131 and supplies them to an external network 200. An apparatus on the external network 200, thus, can use the sensor data.

The sensor network system is activated by using the sync node 100 which functions as a primary controller as a start point. A node which wants to associate with the sensor network, for example, the sensor node 120 generates a beacon request (BEACON REQUEST) as a child node and receives a beacon (BEACON) from the parent node which can be accepted.

The sensor node 120 uniquely decides a parent node from the several received beacons. It is now assumed that the parent node is determined to be the sensor node 110 and the sensor node 120 transmits an association request (Association Request) to the sensor node 110. The sensor node 110 as a parent node returns an association response (Association Response) and allocates a network address to the sensor node 120, thereby fetching the sensor node 120 into the sensor network. Network associating procedures according to a relation between the child node and the parent node are sequentially executed in a tree manner by using the sync node 100 as a start point, so that an alignment of the sensor network system including the sync node 100 and the sensor nodes 110 to 131 is accomplished as a whole.

As mentioned above, the sync node in the sensor network system not only functions as an end point of the collected sensor data but also functions as a start point which manages the whole network. A failure of the sync node, therefore, causes an operation stop of the whole network. The operation stop due to a maintenance inspection or a software updating in the sync node likewise denotes a stop of the whole network. Further, when reactivating from the operation stop, an associating procedure of each node is necessary again and working efficiency is restricted. The restriction deteriorates a reliability evaluation of the sensor network and obstructs a spread of its application.

An arrangement for alternating the sync node without stopping the network operation is, therefore, conceivable. With respect to the point, a concept as an alternate PAN coordinator has been presented in the regulation of IEEE802.15.4 as disclosed in "LOCAL AND METROPOLITAN AREA NETWORK—PART15.4B", IEEE, P802.15.4, REVb/D6 (Non-Patent Document 1) as a part of the standard IEEE802.15.4 by U.S. Society of Electric and Electronics.

SUMMARY OF THE INVENTION

In Non-Patent Document 1, however, a specific operating system of the alternate PAN coordinator is not clearly defined yet. When referring to page 148 of Non-Patent Document 1, the alternate PAN coordinator of 1 bit is prepared in 8-bit capability information (Capability information) of a command format for the association request (Association Request). Even if one bit is prepared, however, this means that a certain node can merely declare that it becomes the alternate PAN coordinator. Even if the node declared that it is the alternate PAN coordinator, the node cannot actually substitute a role of the sync node effectively without stopping the network operation.

It is an object of the invention to provide a radio network system and a control node switching method which can improve a reliability of the network as a whole and improve the working rate.

According to the invention, there is provided a radio network system which includes one control node for setting its own address into a control node address at the time of activating a network and a plurality of general nodes each for setting its own address on the basis of control by the control node when associating with the network and which makes multihop communication of radio data by using each of the addresses between the nodes, wherein the system further includes at least one alternate control node which can be substituted for the control node, and the alternate control node comprises: a control node monitoring component which monitors an operating state in the control node; an operating state discriminating component which discriminates whether or not the operating state is abnormal; and upon-abnormality address setting component which sets its own address into the control node address when it is determined that the operating state is abnormal.

According to the invention, there is also provided a control node switching method in a radio network system which includes one control node for setting its own address into a control node address at the time of activating a network and a plurality of general nodes each for setting its own address on the basis of control by the control node when associating with the network and which makes multihop communication of radio data by using each of the addresses between the nodes, comprising: an alternate control node association control step of allowing at least one alternate control node which can be substituted for the control node to be associated as the general node with the network; a control node monitoring step of monitoring an operating state in the control node; an operating state discriminating step of discriminating whether or not the operating state is abnormal; and an upon-abnormality address setting step of setting an address of the alternate control node into the control node address when it is determined that the operating state is abnormal.

According to the radio network system and the control node switching method of the invention, the reliability of the whole network can be improved and the working rate can be improved.

DETAILED DESCRIPTION OF THE PREFERRED EMBODIMENTS

An embodiment of the invention will now be described in detail with reference to the drawings.

Figure 2:
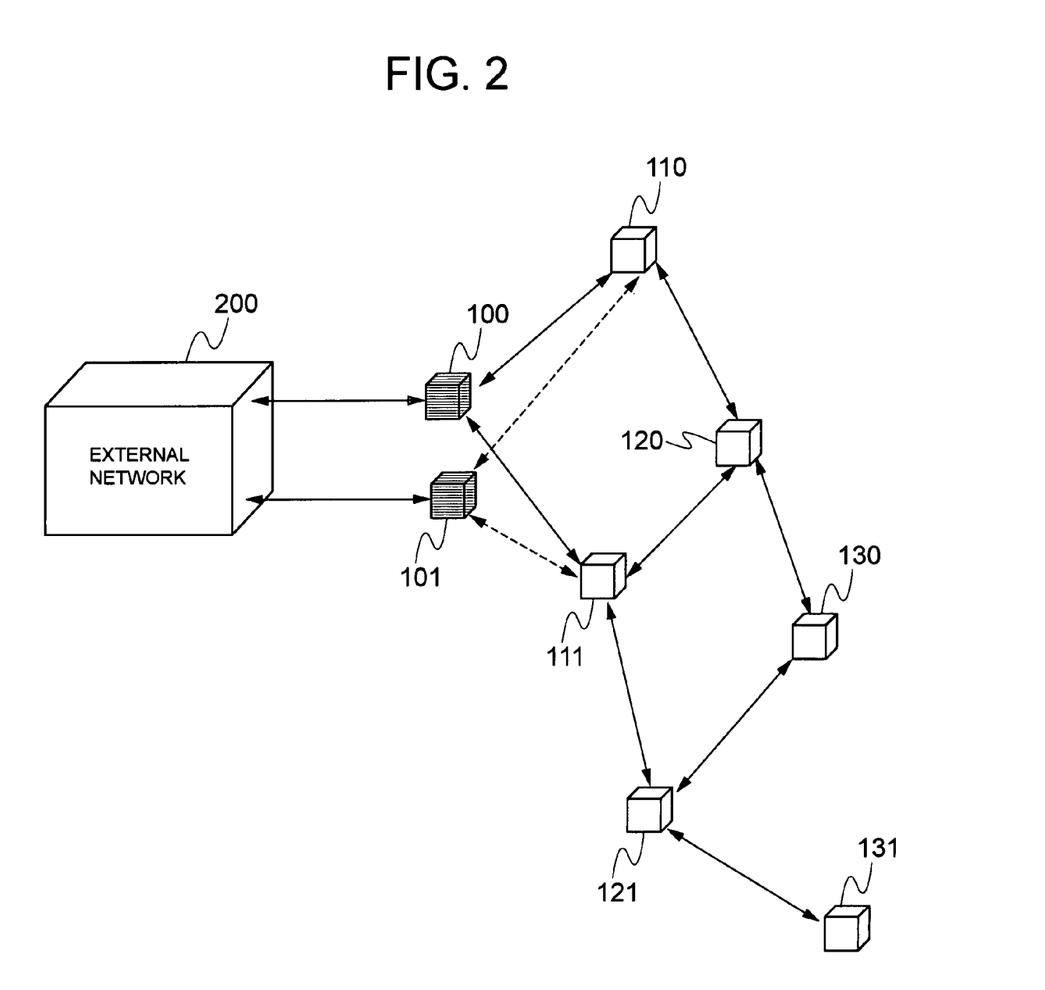
FIG. 2 shows an embodiment of the invention and is a block diagram showing a construction of a sensor network system.

FIG. 2 shows the embodiment of the invention and illustrates a construction of a sensor network system according to the invention The sensor network system includes: the sync node 100 serving as a control node and a subsync node 101; and, for example, six nodes 110, 111, 120, 121, 130, and 131 serving as a plurality of general nodes. Each of the sync node 100 and the subsync node 101 is connected to the external network 200. As an ordinary operation, any one of the sync node 100 and the subsync node 101 collects sensor data from the plurality of sensor nodes 110 to 131 and supplies them to the external network 200. Both of the sync node 100 and the subsync node 101 have the same internal construction as will be described hereinafter. In the embodiment, however, the control node which is preferentially operated as a multicontroller is called a sync node and the alternate control node which is operated as a multicontroller at the time of a fault or maintenance of the sync node is called a subsync node.

Although one subsync node 101 is shown together with one sync node 100 in the embodiment, the invention is not limited to it but two or more subsync nodes may be provided. It is preferable that the subsync node 101 is disposed near the sync node 100 as close as possible in terms of operation, for example, at a position within a range of one hop from the sync node 100.

Figure 3:
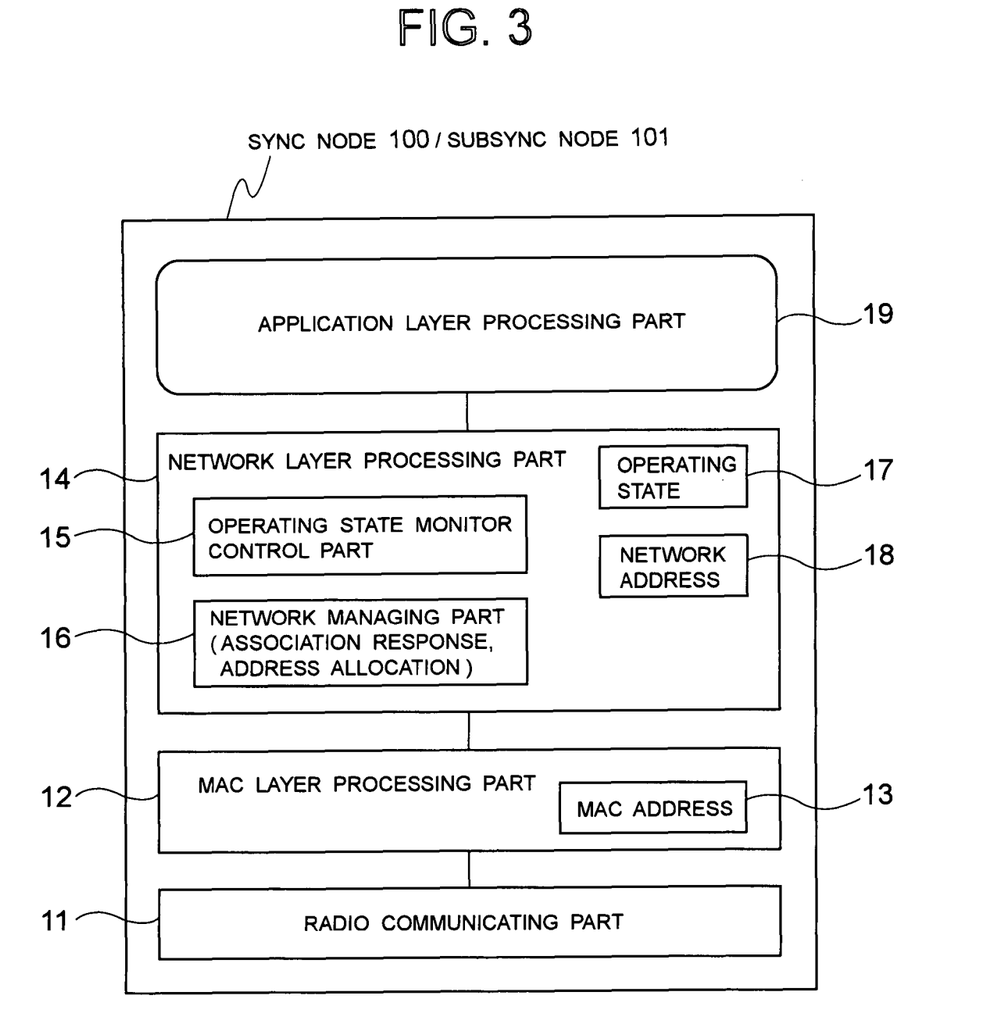
FIG. 3 is a block diagram showing an internal construction of a sync node and a subsync node.

FIG. 3 shows an internal construction of the sync node and the subsync node. Each of the sync node 100 and the subsync node 101 has the same internal construction and includes: a radio communicating unit 11; an MAC layer processing unit 12; a network layer processing unit 14; and an application layer processing unit 19. The radio communicating unit 11 performs a communicating function corresponding to a physical layer and transmits and receives the sensor data and control data such as association request and response to/from another node in a wireless manner.

The MAC layer processing unit 12 performs a communicating function corresponding to an MAC layer, uses an MAC address (IEEE address) which has stationarily been held in an MAC address register 13 as a physical address of the node itself, and relays the sensor data and control data between the radio communicating unit 11 and the network layer processing unit 14.

The network layer processing unit 14 includes: an operating state monitor control unit 15; a network managing unit 16; an operating state register 17; and a network address register 18. The network managing unit 16 performs a communicating function corresponding to a network layer and executes a managing operation of the whole network such as association response as a sync node and allocation of a network address. The network managing unit 16 also uses an address which has temporarily been held in the network address register 18 as its own logic address and relays the sensor data between the MAC layer processing unit 12 and the application layer processing unit 19.

The application layer processing unit 19 executes an arbitrary data process such as a statistical process to the sensor data relayed from the network layer processing unit 14 and, further, supplies the data-processed sensor data to the external network (refer to FIG. 2).

The operating state monitor control unit 15 of the network layer processing unit 14 performs a function for making association request as a subsync node and executing the monitoring operation of the operating state of the sync node in accordance with the operating state which is held and updated in the operating state register 17 and, further, changing its own operating state in accordance with a monitoring result.

Figure 4:
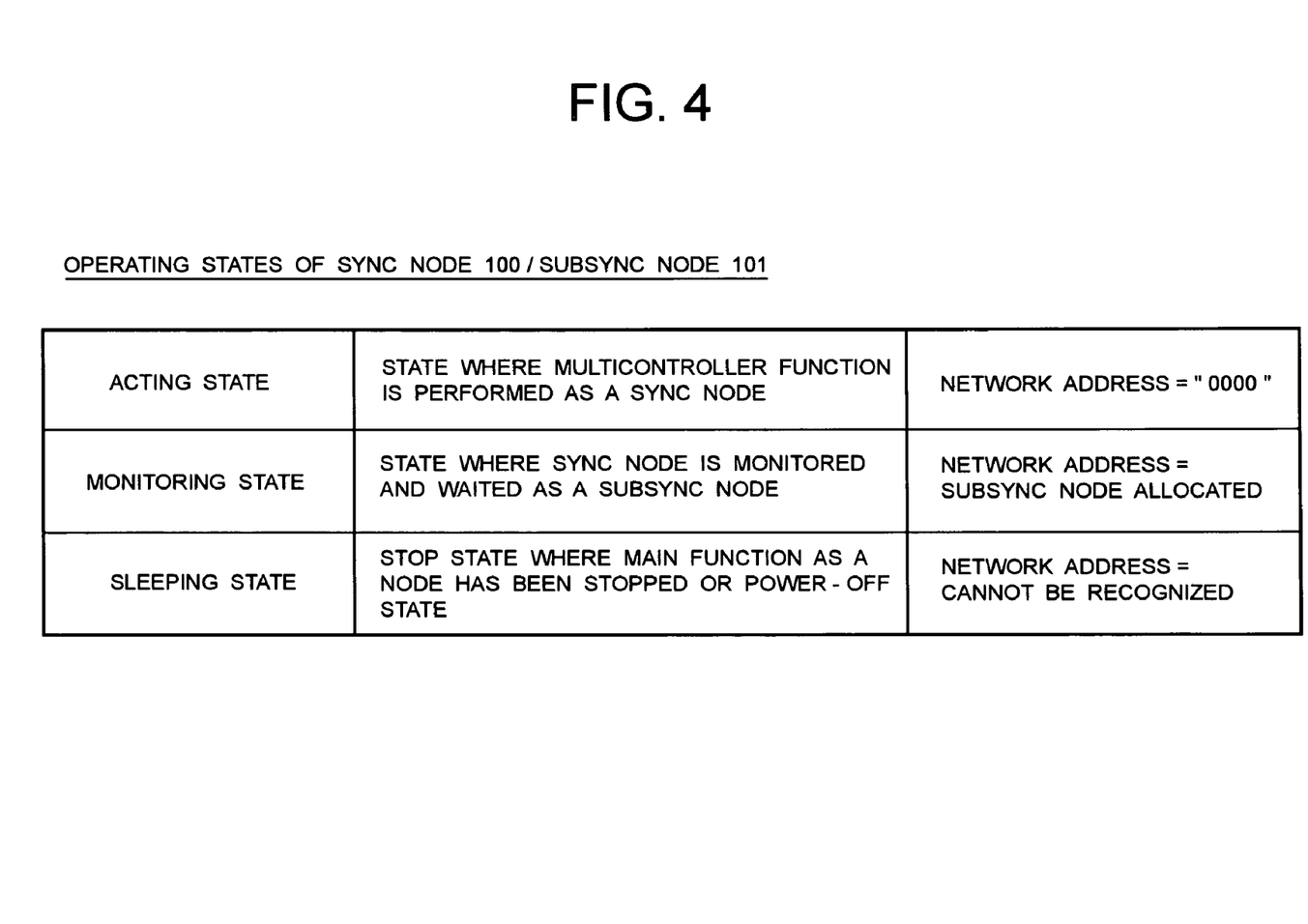
FIG. 4 is an explanatory diagram for describing operating states of the sync node and the subsync node and network addresses.

FIG. 4 is a diagram for describing the operating states of the sync node and the subsync node and the network addresses. Each of the sync node 100 and the subsync node 101 can be set into any one of three states of an acting state, a monitor state, and a sleep state. The acting state is a state where the multicontroller function is performed as an ordinary sync node. The monitor state is a standby state where the sync node is monitored as a subsync node and the state can be shifted to the acting state. The sleep state is a stop state where the main function as a node has been stopped for the purpose of power saving or maintenance or a power-OFF state.

In the acting state, the sync node autonomously sets "0000" (expressed by a hexadecimal notation) into the self node as a network address only for use of the control node. In the monitor state, the network address is allocated to the sync node from the sync node in the acting state. In the sleep state, the network address of the sync node cannot be recognized. That is, the sleep state is a state where the relevant node cannot be recognized to the sensor network system. Those network addresses are temporarily set as logic addresses into the network address register 18 (refer to FIG. 3) of the relevant node.

IEEE802.15.4 specifies a network address allocating method of 16 bits. According to the method, the network address is calculated by a method called (Cskip). Which one of the parent node, child node, and another node the relevant node indicates can be discriminated from the value of the network address.

Figure 5:
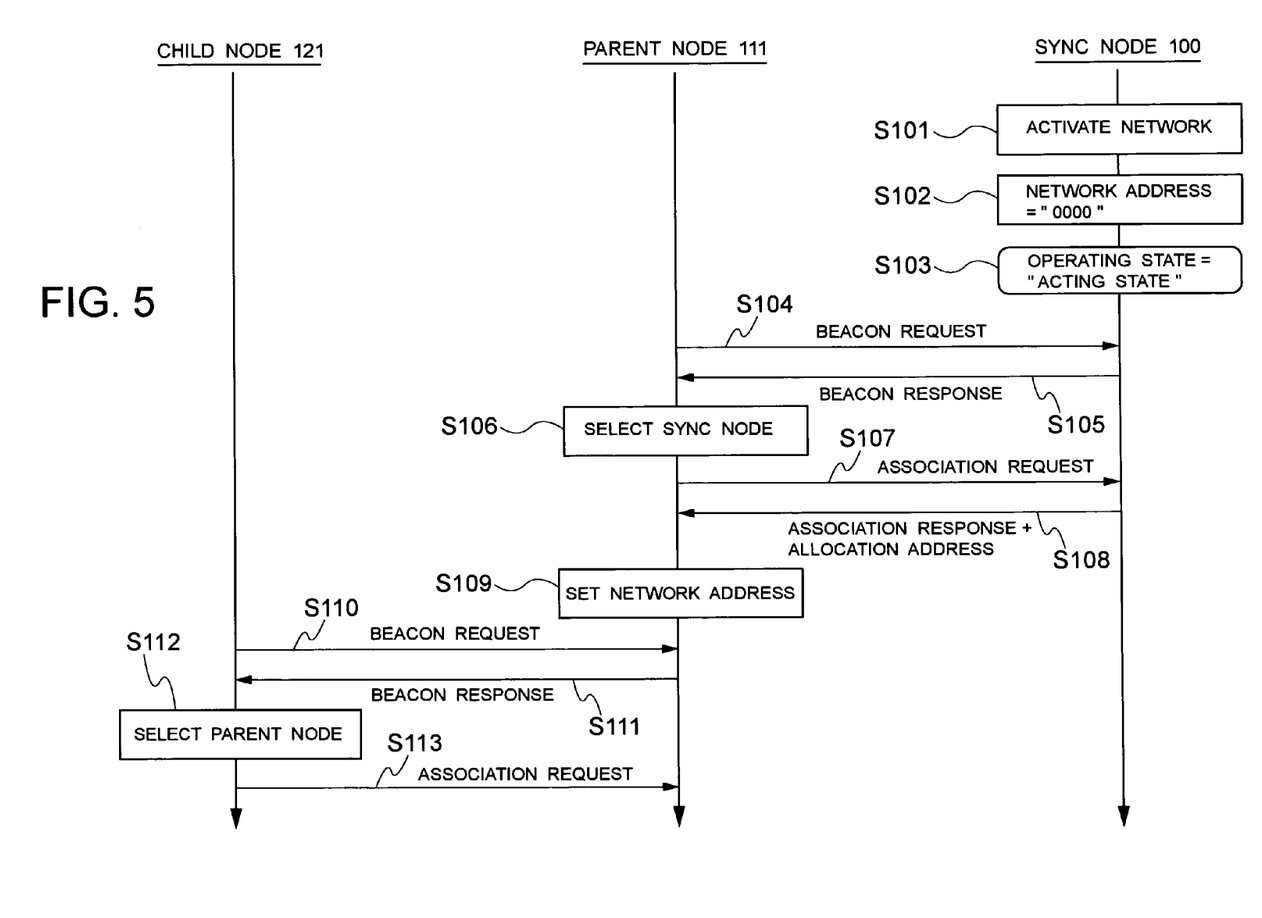
FIG. 5 is a sequence diagram showing initializing and associating procedures upon activation of a network.

FIG. 5 shows initializing and associating procedures upon activation of the network. When the network is activated, all nodes have to be associated by setting the sync node 100 to a start point and the network address has to be allocated to each node. As a part of the procedures, the initializing and associating operations in which the parent node 111 and the child node 121 are assembled into the sensor network system will be described here.

First, the sync node 100 activates the network in response to an activating instruction or the like from the operator (step S101). The sync node 100 sets its own network address into "0000" (step S102) and also autonomously sets its own operating state into the acting state" (step S103).

In a situation where the sync node 100 is in the "acting state", the parent node 111 transmits a beacon request (step S104). It is now assumed that the sync node 100 which received the beacon request has made a beacon response (step S105). The parent node 111 selects the sync node from the sync nodes which have transmitted the beacon responses (step S106). That is, it is assumed here that the sync node 100 has been selected. Subsequently, the parent node 111 transmits an association request to the sync node 100 (step S107). In accordance with it, the sync node 100 transmits an association response and also transmits an allocation address together with it (step S108). As a deciding method of the allocation address, for example, the Cskip method is used. The parent node 111 sets the network address allocated by the sync node 100 into its own logic address (step S109).

In a situation where the network address has been allocated to the parent node 111 and the parent node 111 has been assembled into the sensor network system, the child node 121 transmits a beacon request (step S110). It is now assumed that the parent node 111 which received the beacon request has made a beacon response (step S111). The child node 121 selects the parent node from the sync nodes which have transmitted the beacon responses (step S112). That is, it is assumed here that the parent node 111 has been selected. Subsequently, the child node 121 transmits an association request to the parent node 111 (step S113). The child node 121 is also assembled into the sensor network system by the operation similar to that of the parent node 111.

Figure 6:
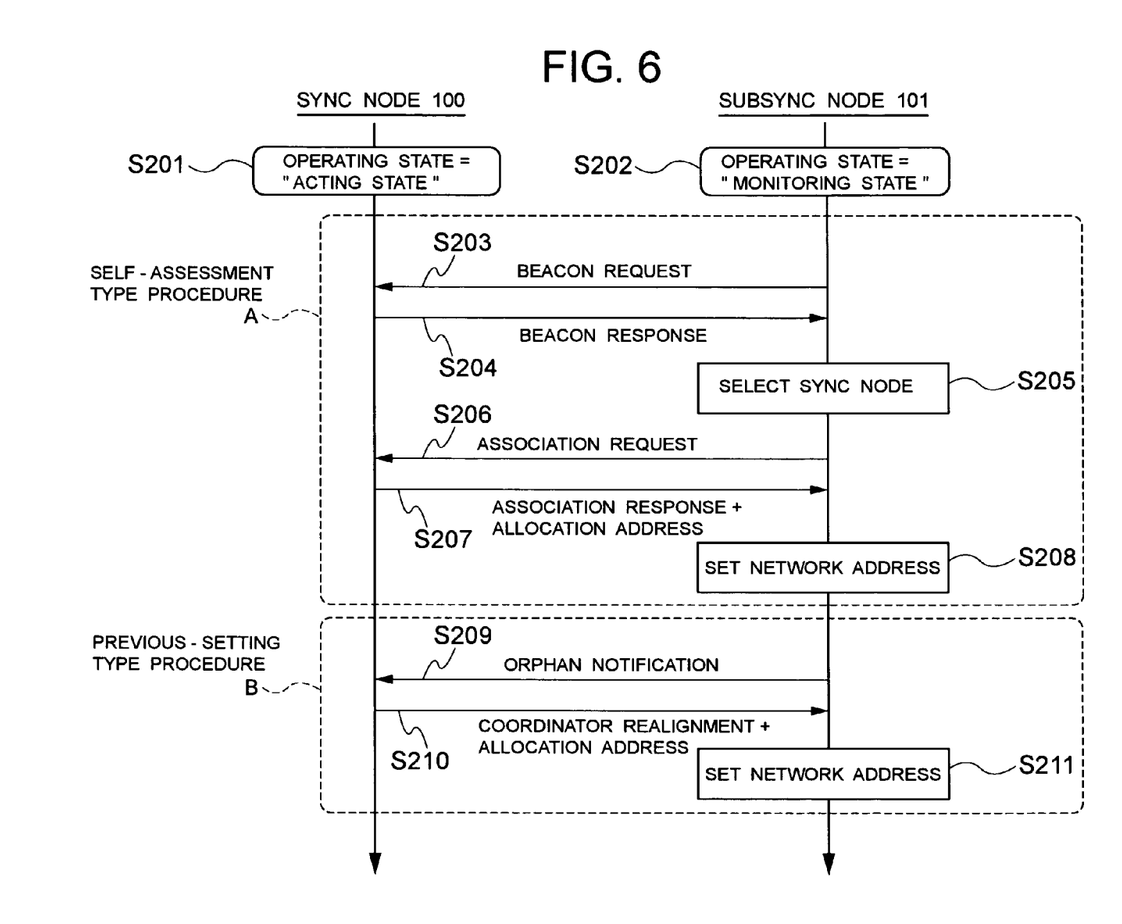
FIG. 6 is a sequence diagram showing an associating of the subsync node.

FIG. 6 shows an associating procedure of the subsync node. The operation which is executed until the sync node 100 is monitored after the subsync node 101 associated with the sensor network will be described here.

It is now assumed that the sync node 100 is in the operating state="acting state" (step S201). It is also assumed that the subsync node 101 has been activated by setting the operating state into the "monitor state" (step S202). The subsync node 101 transmits a beacon request (step S203). It is also assumed that the sync node 100 which received the beacon request has made a beacon response (step S204). The subsync node 101 selects the sync node which can be accepted from the sync nodes which have transmitted the beacon responses (step S205). Assuming that the operation in this case is the operation according to IEEE8O2.15.4, the subsync node 101 recognizes the node, as a sync node, in which a PAN coordinator field included in the received beacon response is a true value (True: 1) and, subsequently, selects one of those sync nodes. In the embodiment, it is assumed that the sync node 100 which is the only sync node has been selected. Subsequently, the subsync node 101 transmits an association request to the sync node 100 (step S206). When the operation according to IEEE8O2.15.4 is likewise presumed here, in the case of transmitting the association request (Association Request), the alternate PAN coordinator field in the capability information (Capability information) field is transmitted as a true value (True: 1).

The sync node 100 transmits an association response in accordance with the association request and also transmits an allocation address together with it (step S207). As a deciding method of the allocation address, for example, the Cskip method is used. The subsync node 101 sets the network address allocated by the sync node 100 into its own logic address (step S208).

In the address allocation in the sync node 100, the address to be allocated to an end device just under the sync node 100, that is, a leaf node on a tree which does not have any child node is allocated to the subsync node 101. It is, consequently, possible to construct the system in such a manner that the existence of the subsync node 101 does not exert an influence on a data transfer or path control of another node in the network.

The foregoing operation is a self-assessment type operation to the subsync node 101. As a result, the sync node 100 knows the existence of the subsync node 101 and the subsync node 101 recognizes the existence of the sync node 100 and recognizes a fact that the node itself has been assembled as a subsync node into the network.

There can be a case where the sync node 100 has already known the subsync node 101. In the case, as a previous-setting type operation, the subsync node 101 transmits an association not-finished notification (Orphan notification) to the sync node 100 (step S209). In response to it, the sync node 100 returns a realignment response (Coordinator realignment) to the subsync node 101 and allocates the network address (step S210). The subsync node 101 sets the network address allocated by the sync node 100 into its own logic address (step S211). By the above operation, the subsync node 101 has newly been assembled as a subsync node into the network.

Figure 7:
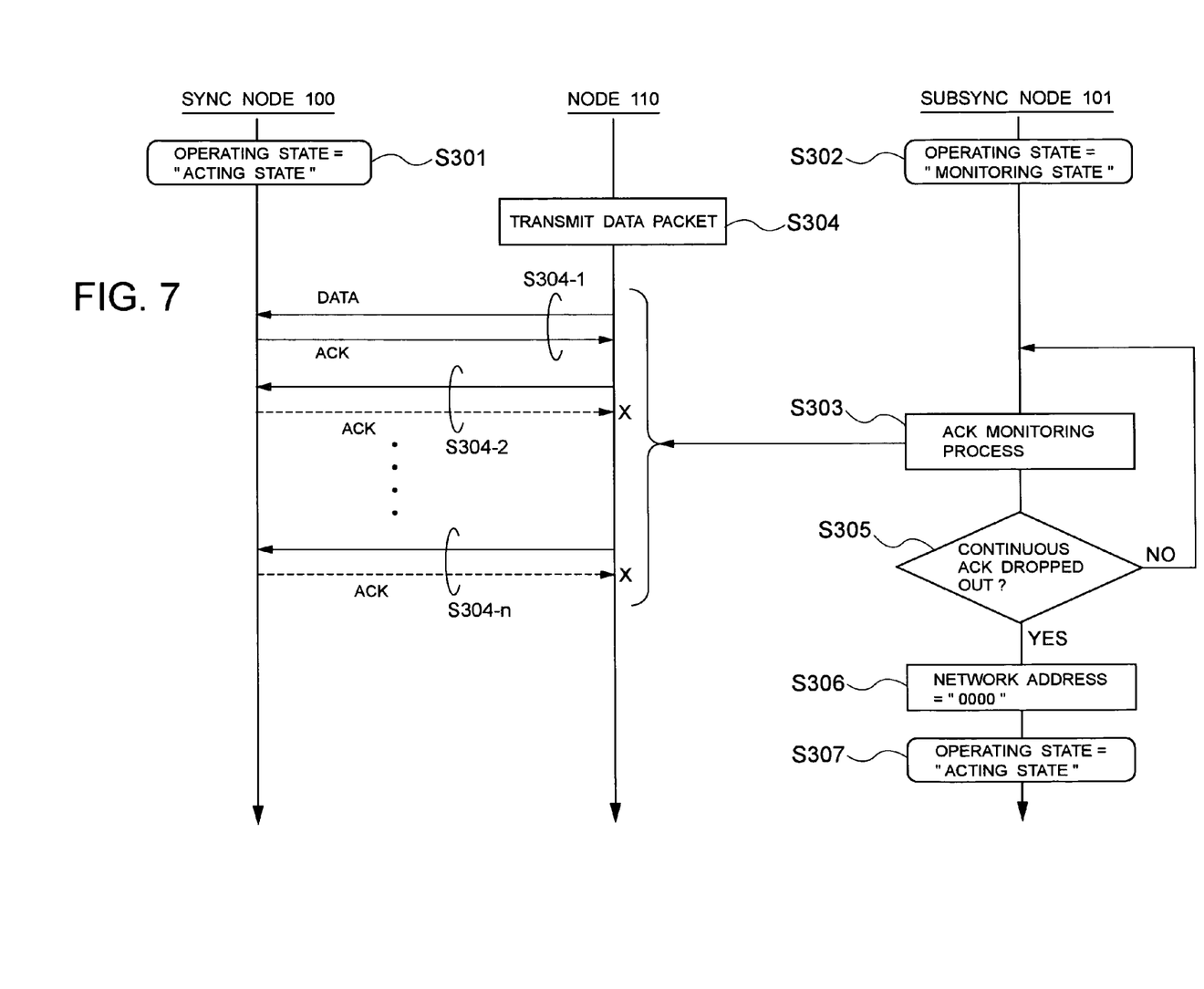
FIG. 7 is a sequence diagram showing a monitoring in a monitor state of the subsync node.

FIG. 7 shows a monitoring procedure in the monitor state of the subsync node. The operation in the case where the subsync node 101 monitors the operation of the sync node 100 will now be described on the assumption that the sync node 100 and the node 111 as an arbitrary node exist. As a prerequisite, the operating state of the sync node 100 is the "acting state" (step S301) and the operating state of the subsync node 101 is the "monitor state" (step S302).

The subsync node 101 executes an ACK monitoring process to the data transmission/reception of the sync node 100 (step S303). In the ACK monitoring process, a data packet from another node to the sync node 100 and an ACK packet from the sync node 100 responsive thereto are monitored. The data packet and the ACK packet showing that the data packet has been received and confirmed have the same sequence number. Whether or not communication between the two nodes has successfully been made, therefore, can be discriminated by monitoring a correspondence of the sequence numbers in a transmission packet and the ACK packet. It is now assumed that in a situation where the subsync node 101 is in the monitor state, the node 110 has started the transmission of the data packet to the sync node 100 (step S304). The node 110 transmits the data packet of a certain sequence number and the sync node 100 which has received the data packet returns a response of the ACK packet (step S304-1). Subsequently, it is assumed that although the node 110 has transmitted the data packet of the next sequence number to the sync node 100, the sync node cannot receive 100 the transmitted data packet due to a cause such as a fault and cannot receive the transmitted data packet but return a response of the ACK packet (step S304-2). At this time, the node 110 discriminates the presence or absence of the response of the ACK packet corresponding to the transmitted data packet and retransmits the data packet of the same sequence number only when there is no ACK packet response. The above operation is repeated so long as the sync node 100 is not recovered from the fault and cannot continuously return the response of the ACK packet (step S304-n).

In the above situation, the subsync node 101 which is in the monitor state discriminates the presence or absence of a drop-out of the continuous ACK packet (step S305). When the drop-out of the ACK packet is detected the number of times over the maximum continuous retransmitting times, the subsync node 101 determines that the operating state of the sync node 100 is abnormal and a failure occurred.

When it is decided that the sync node 100 has failed, the subsync node 101 needs to switch the operating state from the monitor state to the acting state and operate as a sync node. For this purpose, the subsync node 101 sets its own network address to "0000" (step S306) and, further, sets its own operating state to the "acting state" (step S307).

A discrimination reference adapted to decide that the operating state is abnormal in the discriminating step S305 is not limited to the case of the drop-out of the continuous ACK packet mentioned above but various kinds of discrimination references can be set in consideration of the stability of a radio environment or a positional relation between the subsync node and the sync node. For example, the following various kinds of discrimination references may be set: a method whereby when the drop-out of the continuous ACK packet is intermittently detected a plurality of number of times, the abnormality is determined; a method whereby when the drop-out of the continuous ACK packet is detected among a plurality of nodes, the abnormality is determined; and further, a method whereby when a combination of those detecting situation has occurred, the abnormality is determined.

Different from the foregoing autonomous switching method, as a heteronomous switching method, means for directly setting the operating state of each of the sync node 100 and the subsync node 101 into any one of the acting state, monitor state, and sleep state from the external network may be provided. The periodic maintenance of the sync node 100, the updating of the software, or the like, consequently, can be executed while avoiding the stop of the whole network.

Further, the above operation may be executed in such a form that the sync node 100 and the subsync node 101 are alternated.

Figure 8:
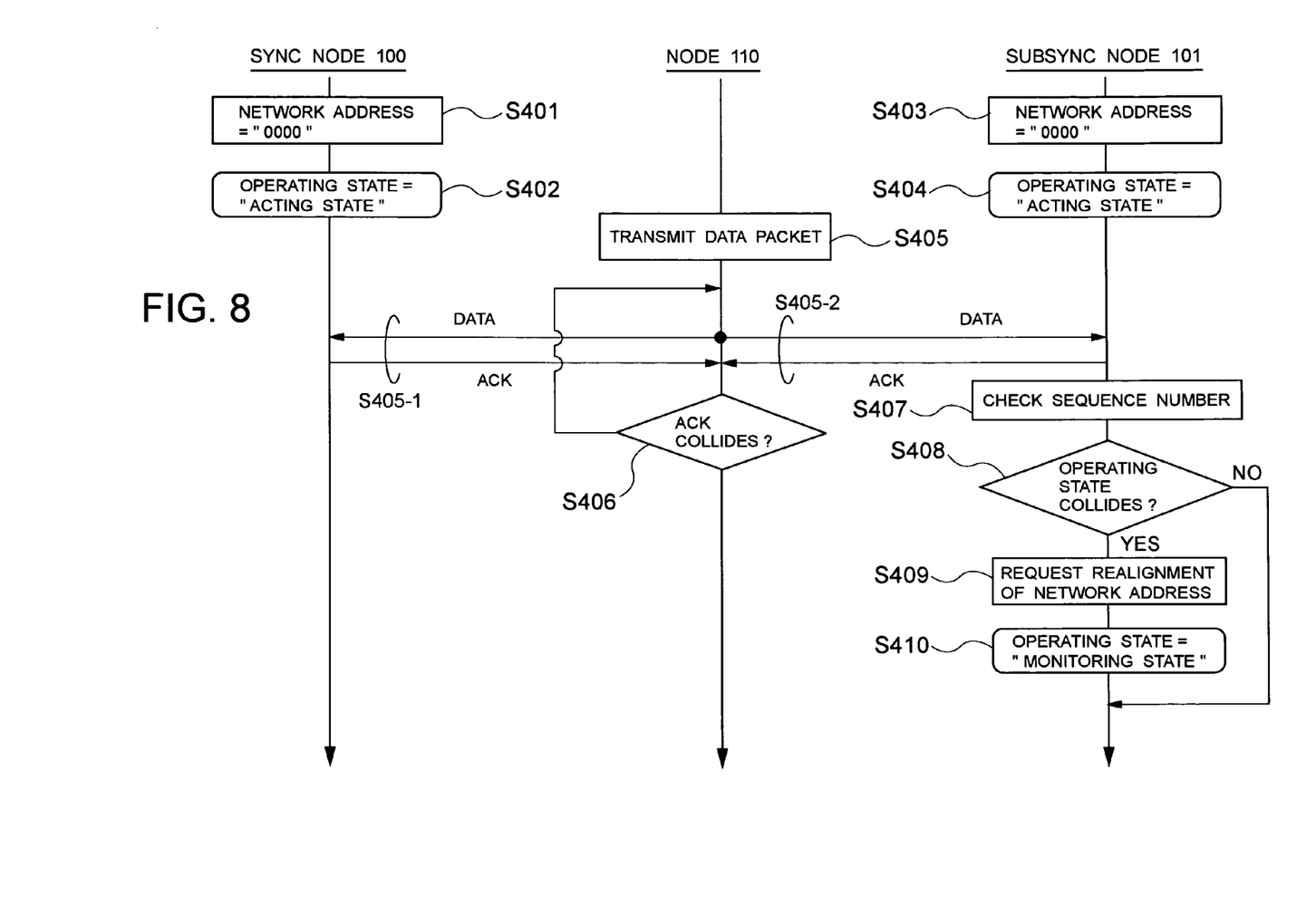
FIG. 8 is a sequence diagram showing a recovering to the monitor state of the subsync node.

FIG. 8 shows a recovering procedure to the monitor state of the subsync node. Although the case where the subsync node is switched to the acting state due to the fault of the sync node 100 has been described in the operating procedure shown in FIG. 7, there can be also a case where the sync node 100 is recovered from the fault state depending on the radio environment. Further, there can be also a case where both of the sync node 100 and the subsync node 101 are set to the acting state due to an operation mistake. It is necessary to avoid the situation mentioned above.

It is, therefore, assumed that the sync node 100 sets its own network address to "0000" (step S401) and also sets the operating state into the "acting state" (step S402) and the subsync node 101 likewise sets its own network address to "0000" (step S403) and also sets the operating state into the "acting state" (step S404).

It is assumed that an arbitrary node, for example, the node 110 has started the transmission of the data packet to the network address "0000" toward the sync node (step S405). The node 110 transmits the data packet of a certain sequence number and the sync node 100 makes a response of the ACK packet of the sequence number in response to it (step S405-1). The data packet of the sequence number is also transmitted to the subsync node 101 and the subsync node 101 likewise makes a response of the ACK packet of the sequence number (step S405-2).

The ACK packets of the same sequence number from both of the sync node 100 and the subsync node 101 can be recognized by the node 110 as a physical collision in the radio signal propagation or as a logical collision in the double or mixed reception. The node 110, therefore, discriminates the presence or absence of the collision of the ACK packets only when the collision has occurred, the node 110 repeats the retransmission of the data packet (step S406). The subsync node 101 checks the sequence number of the data packet as a part of the ordinary data packet reception (step S407). Based on a discrimination result about the presence or absence of the retransmission of the data packets of the same sequence number, therefore, the subsync node 101 discriminates the presence or absence of the collision of the operating state between the sync node 100 and the subsync node 101 (step S408). That is, there is the retransmission of the data packets of the same sequence number, it is determined that there is the collision of the operating state. The subsync node 101 requests a realignment of the network address (step S409). When the operation according to IEEE802.15.4 is presumed, the subsync node 101 again makes the association not-finished notification (Orphan notification) to the sync node 100 and newly receives the allocation of the network address as a subsync node. Subsequently, the subsync node 101 returns its own operating state into the "monitor state".

Figure 9:
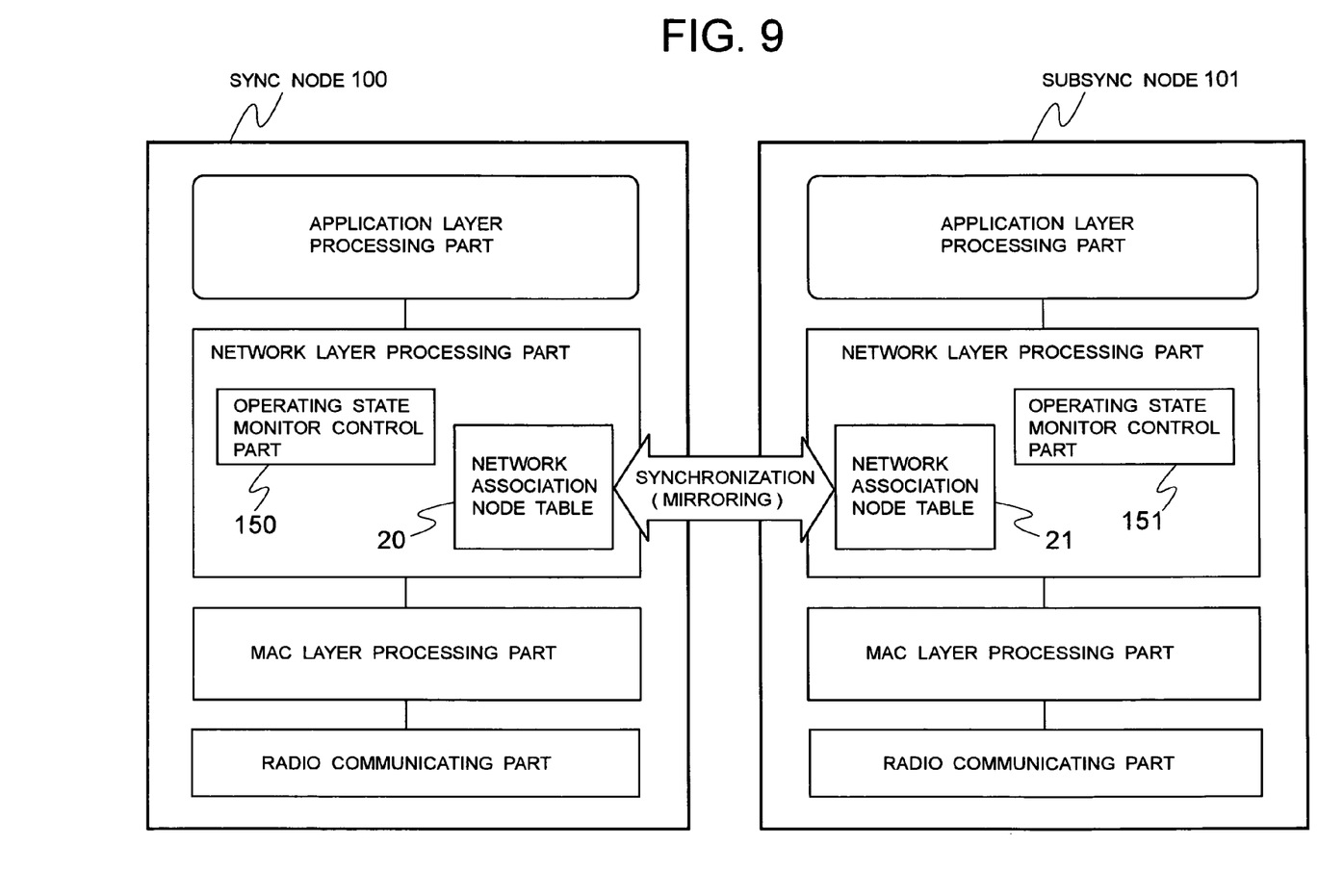
FIG. 9 is a block diagram showing one modification of the invention.

The above operation may be executed in such a form that the sync node 100 and the subsync node 101 are alternated. FIG. 9 is a block diagram showing a modification in which the collision of the operating state is avoided.

A construction shown in the diagram is a modification based on the construction of the embodiment mentioned above. In this instance, between the sync node 100 and the subsync node 101, network association node tables 20 and 21 provided for those nodes are mutually synchronized (mirroring).

Each of the subsync node 101 and the sync node 100 fundamentally has the same construction as shown in FIG. 3.

Further, the sync node 100 has the network association node table 20 and the subsync node 101 has the network association node table 21.

Figure 10:
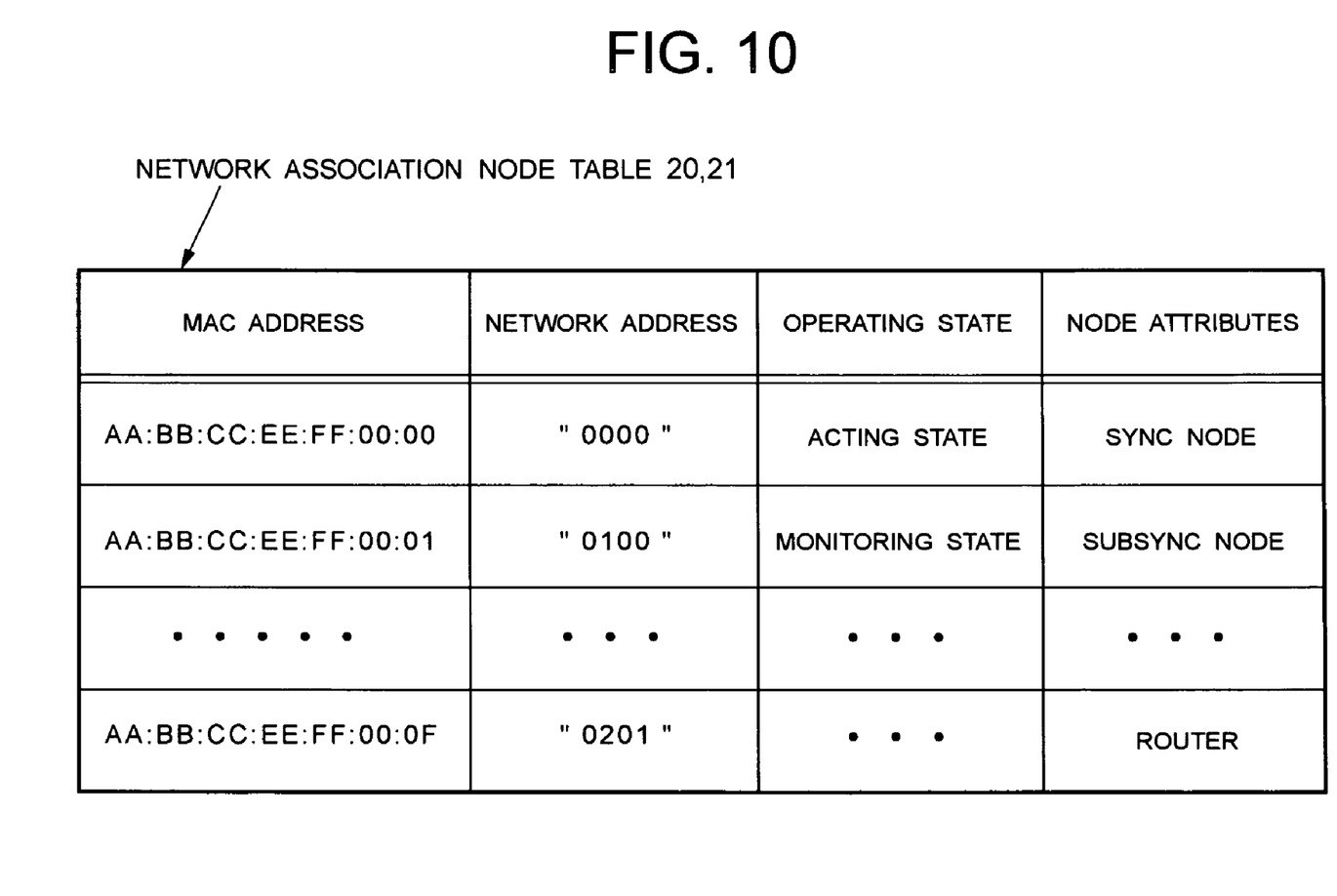
FIG. 10 is a diagram showing a setting example of network association node tables.

Information of each associated node is set into each of the network association node tables 20 and 21 and the following information is set so as to correspond to each other: an MAC address (IEEE address) as a physical address peculiar to the node; the network address as a logic address; node attributes such as sync node, subsync node, router, and end device; and the operating state showing any one of the acting state, monitor state, and sleep state (see FIG. 10).

An operating state monitor control unit 150 of the sync node 100 monitors the operating state of the other node in accordance with the set contents of the synchronized network association node table 20 and controls its own operation so that the operating state does not collide. An operating state monitor control unit 151 of the subsync node 101 also monitors the operating state of the other node in accordance with the set contents of the synchronized network association node table 21 and controls its own operation so that the operating state does not collide.

As a specific communicating method in the synchronization of the network association node tables 20 and 21, first, there is a method whereby the direct communication in which the partner's network address has been designated is made between the sync node 100 and the subsync node 101. Second, there is a method whereby the communication in which the partner's MAC address (IEEE address) has been designated is made between the sync node 100 and the subsync node 101. Further, there is also a method whereby the tables are synchronized through the external network of a wired or wireless system. It is preferable to avoid an increase in traffic upon data exchange between the nodes for the synchronization. For example, it is preferable to exchange only difference data.

As will be understood from the foregoing embodiment, the radio network system and the control node switching method according to the invention provide many effects. For example, first, when it is necessary to switch to the subsync node due to the failure of the sync node, the maintenance, or the like, there is no need to stop the whole system, and the reliability and the working rate of the system can be improved. Second, since the sync node is a node to which all data is collected because of its mechanism, although electric power consumption is large, by alternately setting the sync node and the subsync node into the acting state and making them operative, the electric power consumption per node can be suppressed and they can be also used by the battery driving. The battery can be exchanged in the non-acting state and a life of the system can be extended. Third, since the switching between the sync node and the subsync node is autonomously performed, the switching time can be minimized as compared with that by the artificial operation. Fourth, since the construction in the related art is used for another general nodes other than the sync node and the subsync node, the system can be easily introduced. The radio network system and the control node switching method according to the invention are not limited to the sensor network system described as an embodiment but can be applied to various kinds of radio network systems such as intra-home network in which a plurality of household appliances make the radio multihop communication.

This application is based on Japanese Patent Application No. 2008-252711 which is hereby incorporated by reference.

What is claimed is:

1. A radio network system which includes one control node for setting its own address into a control node address at the time of activating a network, a plurality of general nodes each for setting its own address on the basis of control by said control node when associating with the network and which makes multihop communication of radio data by using each of the addresses between the nodes, and at least one alternate control node that is substitutable for said control node, the alternate control node including:
    a control node monitoring component, which monitors an operating state in said control node;
    an operating state discriminating component, which discriminates whether or not said operating state is abnormal; and
    an upon-abnormality address setting component which sets its own address into said control node address when the operating state discriminating component determines that said operating state is abnormal,
    wherein as the monitoring of said operating state, said control node monitoring means monitors a communicating state of the radio data transmitted from said general node to said control node.

2. A system according to claim 1, wherein when a radio data packet of a same sequence number has repetitively been transmitted as said radio data, said operating state discriminating means determines that said operating state.

3. A system according to claim 1, wherein said alternate control node further comprises a normal time address setting component which sets its own address on the basis of the control by said control node when it is determined by said operating state discriminating component that said operating state of said control node is normal.

4. A control mode switching method in a radio network system which includes one control node for setting its own address into a control node address at the time of activating a network and a plurality of general nodes each for setting its own address on the basis of control by said control node when associating with the network and which makes multihop communication of radio data by using each of the addresses between the nodes, comprising:
    an alternate control node association control step of allowing at least one alternate control node which can be substituted for said control node to be associated as said general node with the network;
    a control node monitoring step of monitoring an operating state in said control node;
    an operating state discriminating step of discriminating whether or not said operating state is abnormal; and
    an upon-abnormality address setting step of setting an address of said alternate control node into said control node address when the operating state discriminating step determines that said operating state is normal,
    wherein said control node monitoring step includes monitoring a communication state of the radio data transmitted from the general node to the control node.

5. A radio network system, which includes one control node for setting its own address into a control node address at the time of activating a network, a plurality of general nodes each for setting its own address on the basis of control by said control node when associating with the network and which makes multihop communication of radio data by using each of the addresses between the nodes, and at least one alternate control node that is substitutable for said control node, the alternate control node including:
    a control node monitoring means for monitoring an operating state in said control node;
    an operating state discriminating means for discriminating whether or not said operating state is abnormal; and
    an upon-abnormality address setting means for setting its own address into said control node address when the operating state discriminating means decides that said operating state is abnormal,
    wherein as the monitoring of said operating state, said control node monitoring means monitors a communicating state of the radio data transmitted from said general node to said control node.

6. A system according to claim 5, wherein when a radio data packet of a same sequence number has repetitively been transmitted as said radio data, said operating state discriminating means determines that said operating state.

7. A system according to claim 5, wherein said alternate control node further comprises normal time address setting means for setting its own address on the basis of the control by said control node when it is determined by said operating state discriminating means that said operating state of said control node is normal.

* * * * *